(12) United States Patent
Kawaguchi et al.

(10) Patent No.: US 7,934,871 B2
(45) Date of Patent: May 3, 2011

(54) DOUBLE ROW BALL BEARING

(75) Inventors: Toshihiro Kawaguchi, Nara (JP);
Toshirou Fukuda, Nara (JP); Yuzuru Takahashi, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 451 days.

(21) Appl. No.: 12/073,903

(22) Filed: Mar. 11, 2008

(65) Prior Publication Data

US 2009/0028483 A1 Jan. 29, 2009

(30) Foreign Application Priority Data

Mar. 12, 2007 (JP) ................ P2007-061447
Mar. 12, 2007 (JP) ................ P2007-061449
Mar. 15, 2007 (JP) ................ P2007-066078

(51) Int. Cl.
*F16C 19/50* (2006.01)
*F16C 33/58* (2006.01)

(52) U.S. Cl. ......... 384/512; 384/474; 384/475; 384/513

(58) Field of Classification Search .......... 384/466–467, 384/469.47–471, 474–476, 512, 523, 540
See application file for complete search history.

(56) References Cited

U.S. PATENT DOCUMENTS

| | | | | |
|---|---|---|---|---|
| 2,019,464 A * | 10/1935 | Riblet | ............ | 384/571 |
| 2,282,883 A * | 5/1942 | Powers | ............ | 384/469 |
| 4,824,264 A | 4/1989 | Hoebel | | |
| 4,854,748 A * | 8/1989 | Gabelli et al. | ............ | 384/474 |
| 4,969,430 A * | 11/1990 | Masuda | ............ | 123/196 R |
| 5,192,139 A * | 3/1993 | Hiramoto et al. | ............ | 384/476 |
| 5,711,615 A * | 1/1998 | Stitz et al. | ............ | 384/473 |
| 6,015,264 A * | 1/2000 | Violette et al. | ............ | 416/146 A |
| 6,105,724 A * | 8/2000 | Stitz et al. | ............ | 384/475 |
| 6,363,708 B1 | 4/2002 | Rakhmailov | | |
| 6,397,576 B1 | 6/2002 | Rakhmailov | | |
| 6,460,324 B1 | 10/2002 | Rakhmailov | | |
| 6,497,563 B1 * | 12/2002 | Steffens | ............ | 418/88 |
| 6,623,251 B2 * | 9/2003 | Nawamoto et al. | ............ | 417/290 |
| 6,769,809 B2 * | 8/2004 | Maret | ............ | 384/512 |
| 6,932,736 B2 * | 8/2005 | Yamamoto | ............ | 476/46 |
| 2004/0003968 A1 | 1/2004 | Rakhmailov | | |
| 2005/0063627 A1 * | 3/2005 | Ueda et al. | ............ | 384/523 |
| 2005/0220383 A1 | 10/2005 | Yokota et al. | | |
| 2007/0196039 A1 * | 8/2007 | Kawaguchi et al. | ............ | 384/625 |

FOREIGN PATENT DOCUMENTS

| | | | |
|---|---|---|---|
| EP | 0 279 888 A2 | | 8/1988 |
| EP | 1 574 729 A1 | | 9/2005 |
| GB | 195392 | | 4/1924 |
| GB | 539502 A | * | 9/1941 |
| GB | 834079 | | 5/1960 |

(Continued)

OTHER PUBLICATIONS

European Search Report dated Mar. 4, 2010.

(Continued)

*Primary Examiner* — Marcus Charles
(74) *Attorney, Agent, or Firm* — McGinn IP Law PLLC

(57) ABSTRACT

The large diameter cage has an asymmetric shape, a diameter (discharge diameter) of which close to an opening is larger than a diameter (inflow diameter) close to the small diameter cage, and the small diameter cage has a symmetric shape, in which a diameter (inflow diameter) of which close to an opening is equal to a diameter (discharge diameter) close to the large diameter cage.

13 Claims, 4 Drawing Sheets

FOREIGN PATENT DOCUMENTS

| | | |
|---|---|---|
| JP | 61-109914 | 5/1986 |
| JP | 2002250352 A * | 9/2002 |
| JP | 2003-294032 | 10/2003 |
| JP | 2004092687 A * | 3/2004 |
| JP | 2005-163891 | 6/2005 |
| JP | 2005-163928 | 6/2005 |
| JP | 2005-172035 | 6/2005 |
| JP | 2006046454 A * | 2/2006 |
| JP | 2006-234100 | 9/2006 |
| JP | 2007-92860 | 4/2007 |

OTHER PUBLICATIONS

European Search Report dated May 21, 2010.

* cited by examiner

DOUBLE ROW BALL BEARING

BACKGROUND OF THE INVENTION

1. Field of the Invention

The invention relates to a double row ball bearing, and more particularly, to a so-called tandem double row ball bearing that is lubricated using lubricant housed in a final reduction gear of a vehicle and is suitable to support a pinion shaft.

2. Related Art

A tandem double row ball bearing includes an outer ring, an inner ring, and balls disposed in double rows between both of the rings, and a cage for retaining the balls. The double row ball bearing has been widely used in a pinion shaft supporting device for vehicles or the like as shown in JP 2006-234100A.

FIG. 2 illustrates an example of a differential gear device to which a double row ball bearing according to the invention is applied. The differential gear device includes a pinion shaft 42 that is rotatably supported to a housing 41 and has a pinion gear 43 disposed at a rear end thereof; a ring gear 44 engaging with the pinion gear 43; a pair of double row ball bearings 45 and 46 that allows the pinion shaft 42 to be rotatably supported to the housing 41, the double row ball bearing 45 being located on a side of the pinion gear 43 and the double row ball bearing 46 being located on as side opposite to the pinion gear 43; and a flange joint 47 is provided at an outer end of the pinion shaft 42 to connect a drive shaft.

In the differential gear device, lubricant flipping up according to rotation of the ring gear 44 is introduced at a middle portion along the axial direction between the pair of double row ball bearings 45 and 46 through a lubricant passage 48 provided in the housing 41. When the double row ball bearings 45 and 46 are rotated, a fluid flow (pumping action) occurs from a small diameter side to a large diameter side. Accordingly, in the double row ball bearings 45 and 46 for differential gear device, the small diameter side of each of the double row ball bearings 45 and 46 is located close to the shaft, and the lubricant is supplied from the small diameter side (accurately middle portion between one pair of double row ball bearings) and is discharged from the large diameter side by the pumping action. Such a lubricating method has been generally applied.

In such a kind of double row ball bearing, a large diameter cage for retaining a plurality of large diameter balls and a small diameter cage for retaining a plurality of small diameter balls are used as cages. These cages have a similar shape except for difference in diameter. That is, in the general double row ball bearing, the large diameter cage and the small diameter cage are formed substantially in a conical asymmetrical shape. On the contrary, in JP 2006-234100A, the large diameter cage and the small diameter cage are formed substantially in a cylindrical symmetrical shape.

In the pinion shaft supporting devices for vehicles, in order to reduce loss, it is important to reduce rotational torque of a bearing. In order to reduce the rotational torque, it is effective to suppress agitation resistance caused by lubricant. According to the double row ball bearing described in JP 2006-234100A, the small diameter cage has a symmetric shape to suppress the amount of flowing-in lubricant, thereby suppressing agitation resistance caused by lubricant. However, in JP 2006-234100A, since the large diameter cage has a shape similar to that of the small diameter cage except for difference in diameter, the amount of flowing-out lubricant is suppressed. Accordingly, the amount of lubricant staying in the bearing increases and thus the effect to reduce agitation resistance may decrease.

SUMMARY OF THE INVENTION

An object of the invention is to provide a double row ball bearing capable of reducing torque by suppressing agitation resistance as a result of optimizing combination of cages and/or the amount of lubricant in the bearing.

An object of the invention is to provide a double row ball bearing in which the amount of lubricant in the bearing is appropriately controlled to suppress agitation resistance caused by the lubricant, thereby reducing torque.

According to the invention, there is provided a double row ball bearing including: an outer ring that has double row raceway surfaces different in diameter from each other; an inner ring that has double row raceway surfaces corresponding to the raceway surfaces of the outer ring, respectively; a plurality of large diameter balls and a plurality of small diameter balls that are disposed between the raceway surfaces of the rows of the inner and outer rings with different pitch diameters, respectively; a large diameter cage that retains the plurality of large diameter balls; and a small diameter cage that retains the plurality of small diameter balls, wherein the large diameter cage has an asymmetric shape with respect to a center in an axial direction, a diameter of which close to an end section opening is larger than a diameter close to the small diameter cage, and wherein the small diameter cage has a symmetric shape with respect to a center in an axial direction, a diameter of which close to an end section opening is equal to a diameter close to the large diameter cage.

The double row ball bearing having the double row raceway surfaces different in diameter has a pumping action allowing the lubricant to flow from the small diameter side to the large diameter side. An asymmetry cage promotes the pumping action of the bearing, and a symmetry cage suppresses the pumping action of the bearing. Accordingly, the small diameter cage is formed in the symmetry shape, thereby suppressing that the lubricant flows into the bearing, and the large diameter cage is formed in the asymmetry shape, thereby promoting that the lubricant is discharged out of the bearing (the lubricant is prevented from staying in the bearing). Accordingly, agitation resistance is greatly reduced, and thus it is possible to reduce torque.

In order to secure such an operation, the pillar portions of the large diameter cage preferably have a substantially taper shape in which the pillar portions get wider as they go to the large diameter side (the pillar portion is inclined to the axial direction, a diameter of which gets larger as it goes to the outside of the axial direction), and the pillar portions of the small diameter cage overall preferably have a substantially cylindrical shape (the pillar portion is parallel to the axial direction).

According to the double row ball bearing of the invention, since the small diameter cage has the symmetry shape, it is suppressed that the lubricant flows into the bearing, and since the large diameter cage has the asymmetry shape, the lubricant is promoted to be discharged out of the bearing, thereby greatly reducing agitation resistance. Accordingly, it is possible to reduce torque.

According to another aspect of the invention, there is provided a double row ball bearing including: an outer ring; an inner ring; a plurality of balls disposed in double rows between both of the rings; and cages that retain the balls, in which lubricant is moved by a pumping action of the bearing, wherein the outer ring is provided with a lubricant discharging passage for discharging the lubricant between the double row balls to the outside.

For example, the double row ball bearing is lubricated in an oil bath manner, and the lubricant flowing in from one end section opening is discharged from the other end section opening by a pumping action of the ball bearing (graded-junction ball bearing). At least one lubricant discharging passage is provided at a portion of the outer ring corresponding to a portion between the double row balls in the axial direction. Generally, there is no case where the amount of lubricant supplied into the bearing is controlled. Since the pumping action increases together with increase of the number of rotation, the amount of lubricant flowing into the bearing increases together with increase of the number of rotation. As a result, agitation resistance of the lubricant increases, and torque increases. According to the lubricant discharging passage provided in the outer ring, since it becomes easier that the lubricant is discharged to the outside as centrifugal force increases, the amount of lubricant discharged from the opening increases together with increase of the number of rotation. Therefore, the amount of lubricant staying in the bearing is appropriately controlled.

At least one lubricant discharging passage is provided, and preferably, a plurality of lubricant discharging passages are provided at predetermined intervals in a circumferential direction. The housing or the like, to which the outer ring are attached, is provided appropriately with a lubricant circulating passage for returning the lubricant, which is discharged from the lubricant discharging passage, to the lubricant supplying passage.

As the double row ball bearing, for example, there may be used a so-called tandem double row ball bearing including: an outer ring that has double row raceway surfaces different in diameter from each other; an inner ring that has double row raceway surfaces corresponding to the raceway surfaces of the outer ring, respectively; a plurality of large diameter balls and a plurality of small diameter balls that are disposed between the raceway surfaces of the rows of the inner and outer rings with different pitch diameters, respectively; a large diameter cage that retains the plurality of large diameter balls; and a small diameter cage that retains the plurality of small diameter balls. However, the double row ball bearing is not limited thereto, a double row ball bearing formed by facing graded-junction ball bearings having raceway surfaces equal in diameter may be used.

According to the double row ball bearing, since the outer ring is provided with the lubricant discharging passage for discharging the lubricant in the bearing to the outside, the amount of lubricant discharged from the lubricant discharging passage increases together with the increase of the number of rotation, thereby appropriately controlling the amount of lubricant staying in the bearing. Therefore, it is possible to reduce torque.

According to another aspect of the invention, there is provided a double row ball bearing including: an outer ring; an inner ring; a plurality of balls disposed in double rows between both of the rings; and cages that retain the balls, in which lubricant is moved by a pumping action of the bearing, wherein the lubricant is discharged from a discharge end section of the pumping action, the lubricant is prevented from flowing in from an inflow end section of the pumping action, and the outer ring is provided with a lubricant supplying passage for dripping the lubricant to the balls disposed on the inflow side of the pumping action.

The double row ball bearing discharges the flowing-in lubricant by the pumping action. Conventionally, such a kind of double row ball bearing uses oil bath lubrication, but the oil bath lubrication is out of use because the oil bath lubrication results in increase of the amount of lubricant. The lubricant supplying passage is provided in the uppermost portion of the outer ring where the lubricant can be dripped to the balls disposed on the pumping action inflow side. For example, the lubricant supplying passage may be provided in the vicinity of the end portion of the outer ring and at a portion corresponding to the outside of the balls in the axial direction, and may be provided in the vicinity of the center of the outer ring and at a portion corresponding to the inside of the balls in the axial direction. In order to optimize the amount of lubricant, the later is more preferable. With such a configuration, the lubricant is directly supplied to the balls disposed on the pumping action inflow side, and the lubricant is supplied to the balls disposed on the pumping action discharge side by the pumping action of the balls disposed on the pumping action inflow side.

In the housing or the like to which the outer ring is attached, an in-housing lubricant supplying passage for supplying the lubricant to the lubricant supplying passage is appropriately formed. A passage diameter of the lubricant supplying passage including the in-housing lubricant supplying passage is adjusted to optimize the amount of lubricant staying in the bearing (as small as possible and to securely prevent seizure).

As the double row ball bearing, for example, there may be used a so-called tandem double row ball bearing including: an outer ring that has double row raceway surfaces different in diameter from each other; an inner ring that has double row raceway surfaces corresponding to the raceway surfaces of the outer ring, respectively; a plurality of large diameter balls and a plurality of small diameter balls that are disposed between the raceway surfaces of the rows of the inner and outer rings with different pitch diameters, respectively; a large diameter cage that retains the plurality of large diameter balls; and a small diameter cage that retains the plurality of small diameter balls. However, the double row ball bearing is not limited thereto, a double row ball bearing having raceway surfaces equal in diameter may be used.

According to the above-described double row ball bearing, since the outer ring is provided with the lubricant supplying passage for supplying the lubricant into the bearing, it is possible to remove the oil bath lubrication that easily causes increase in lubricant. In addition, it is possible to optimize the amount of lubricant staying in the bearing by adjusting the passage diameter of the lubricant supplying passage, thereby reducing torque.

Additionally, the double row ball bearing according to the invention is applicable to at least one of the double row ball bearings in a differential gear device comprising:

a pinion shaft that is rotatably supported to a housing and that has a pinion gear disposed at a rear end thereof;

a ring gear engaging with the pinion gear;

a pair of double row ball bearings that allows the pinion shaft to be rotatably supported to the housing, one of which is located on a side of the pinion gear and the other of which is located on a side opposite to the pinion gear; and a flange joint is provided at an outer end of the pinion shaft to connect a drive shaft.

DETAILED DESCRIPTION OF THE PREFERRED EMBODIMENTS

Hereinafter, embodiments of the invention will be described with reference to the drawings.

First Embodiment

Figure 1:
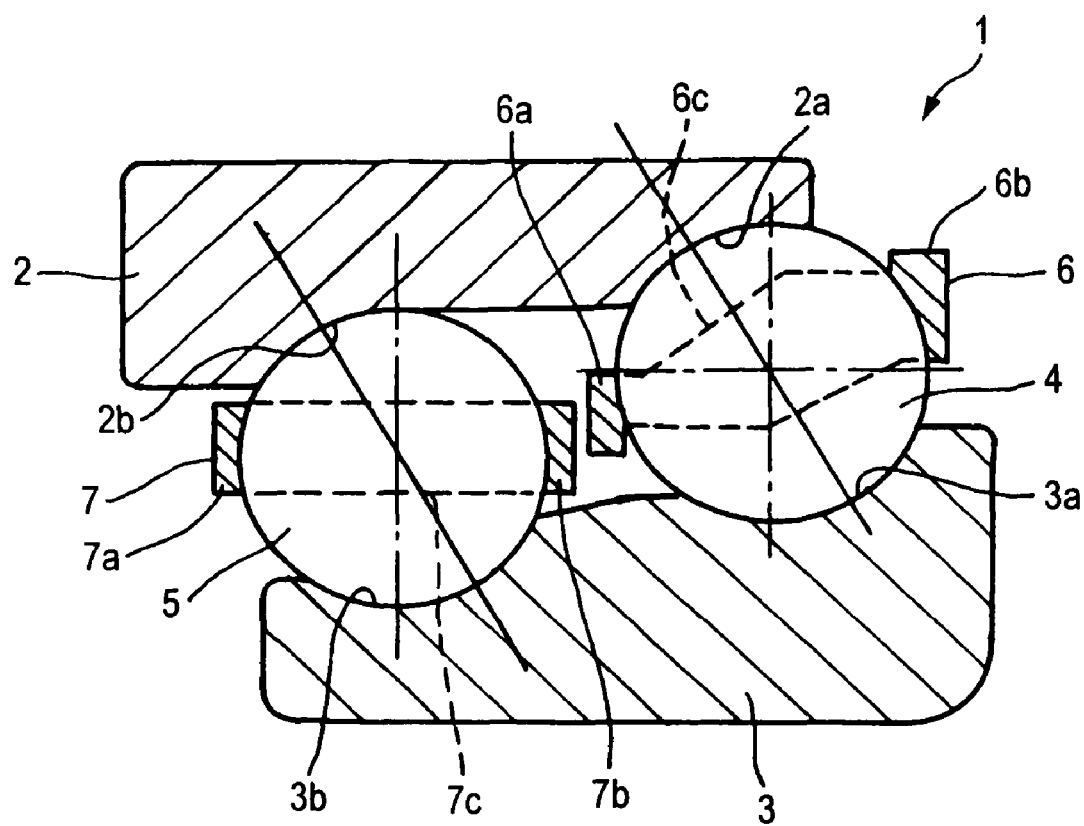
FIG. 1 is a longitudinal sectional view illustrating an upper half portion of a double row ball bearing according to an embodiment of the invention.

FIG. 1 illustrates a first embodiment of a double row ball bearing according to the invention. The double row ball bearing 1 includes: an outer ring 2 that has double row raceway surfaces 2a and 2b different in diameter from each other and is attached to a housing (not shown); an inner ring 3 that has double row raceway surfaces 3a and 3b corresponding to the raceway surfaces 2a and 2b of the outer ring 2 and is attached to a rotation shaft (not shown); a plurality of large diameter balls 4 and a plurality of small diameter balls 5 that are disposed between the raceway surfaces 2a and 3a, and 2b and 3b of the rows of the inner and outer rings 2 and 3 with different pitch diameters, respectively; a large diameter cage 6 that retains the plurality of large diameter balls 4; and a small diameter cage 7 that retains the plurality of small diameter balls 5.

In the same figure, an outer diameter of the left raceway surface 3b of the inner ring 3 is smaller than an outer diameter of the right raceway surface 3a of the inner ring 3. An inner diameter of the left raceway surface 2b of the outer ring 2 is smaller than an inner diameter of the right raceway surface 2a of the outer ring 2. Contact angles of the large diameter ball 4 and the small diameter ball 5 are in the same direction (which is not limited to the same angle). Lubricant is supplied from the left side (i.e., small diameter side) of the figure and then the lubricant is discharged from the right side (i.e., large diameter side) of the figure by a pumping action of the double row ball bearing 1.

In the conventional double row ball bearing, a large diameter cage and a small diameter cage have a similar shape except for difference in diameter. All of the cages have an asymmetric shape, or all of the cages have a symmetric shape. That is, the cages have any one kind of shapes. On the contrary, in the double row ball bearing 1 according to the invention, the large diameter cage 6 has an asymmetric shape, a diameter (discharge diameter) of which close to a right end section opening is larger than a diameter (inflow diameter) close to the small diameter cage 7, and the small diameter cage 7 has a symmetric shape, a diameter (inflow diameter) of which close to a left end section opening is equal to a diameter (discharge diameter) close to the large diameter cage 6.

The combination of the symmetric shape and the asymmetric shape is in consideration of the pumping action from the left to the right in the left and right angular ball bearings that are both of left and right double row ball bearings 1 serving as angular ball bearings. The large diameter cage 6 includes a small diameter ring portion 6a disposed on the left side (inside in the axial direction), a large diameter ring portion 6b disposed on the right side (outside in the axial direction), pillar portions 6c that form a pocket for housing the balls 4 between both of the ring portions 6a and 6b. Overall, the large diameter cage 6 is formed in a tapered tubular shape, a diameter of which gets larger as it goes from the left side to the right side. The pillar portions 6c are inclined to the axial direction according to the direction along which the lubricant flows from the small diameter side to the large diameter side. Accordingly, the lubricant smoothly flows to promote the discharge of the lubricant. The small diameter cage 7 includes a pair of ring portions 7a and 7b having the same diameter smaller than the small diameter ring portion 6a of the larger diameter cage 6, and pillar portions 7c that forms a pocket for housing the balls 5 between both of the ring portions 7a and 7b. Overall, the small diameter cage 7 is formed substantially in a cylindrical shape. The pillar portions 7c are formed in a direction crossing to a direction in which the lubricant flows from the small diameter side to the large diameter side, in parallel to the axial direction. Accordingly, it is disturbed for the lubricant to smoothly flow, and thus it is difficult that the lubricant flows in.

Figure 2:
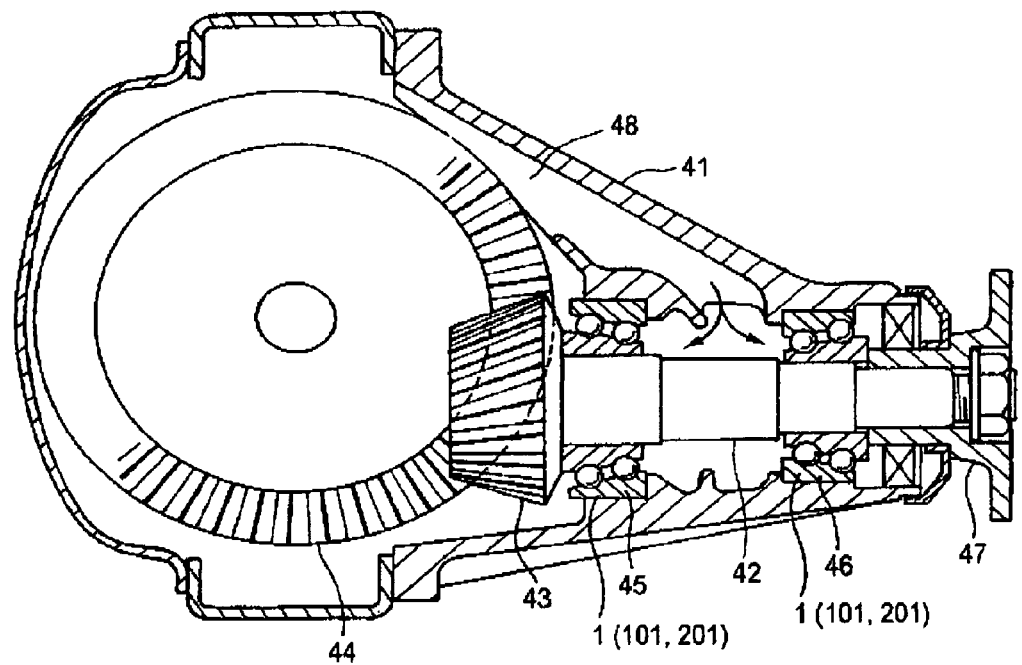
FIG. 2 is a longitudinal sectional view illustrating a differential gear device as an example in which the double row ball bearing of the invention is used.

The double row ball bearing 1 of the invention is suitably used as a bearing device that rotatably supports a pinion shaft 42 to a housing 41 in the differential gear device for vehicles shown in FIG. 2.

FIG. 2 illustrates an example of a differential gear device to which a double row ball bearing according to the invention is applied. The differential gear device includes the pinion shaft 42 that is rotatably supported to the housing 41 and has a pinion gear 43 disposed at a rear end thereof; a ring gear 44 engaging with the pinion gear 43; a pair of double row ball bearings 45 and 46 that allows the pinion shaft 42 to be rotatably supported to the housing 41, the double row ball bearing 45 being located on a side of the pinion gear 43 and the double row ball bearing 46 being located on as side opposite to the pinion gear 43; and a flange joint 47 is provided at an outer end of the pinion shaft 42 to connect a drive shaft.

The double row ball bearing 1 is lubricated by the lubricant housed in the housing 41. When a large amount of lubricant stays in the bearing 1, rotation torque increases. However, in the double row ball bearing 1 as described above, since the small diameter cage 7 has the symmetry shape and the large diameter cage 6 has the asymmetry shape, the lubricant is suppressed from flowing into the bearing 1 and the lubricant is promoted to be discharged out of the bearing, thereby reducing torque.

Second Embodiment

Figure 3:
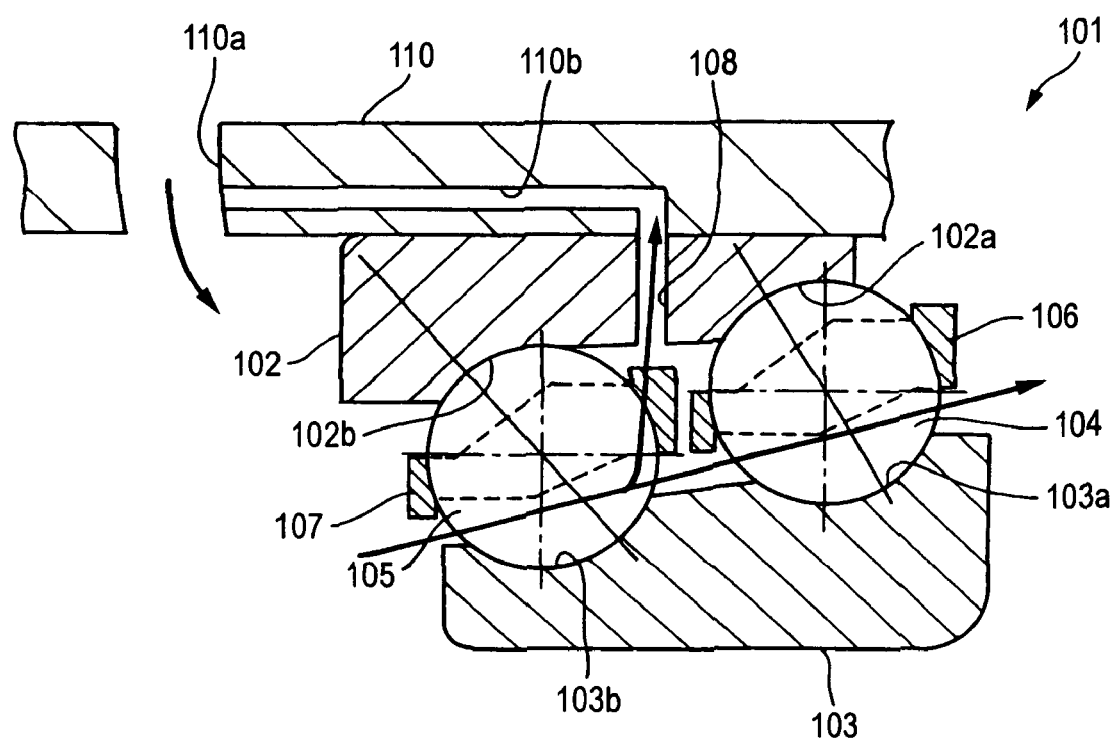
FIG. 3 is a longitudinal sectional view illustrating an upper half portion of a double row ball bearing according to an embodiment of the invention.

FIG. 3 illustrates a second embodiment of a double row ball bearing according to the invention. The double row ball bearing 101 includes: an outer ring 102 that has double row raceway surfaces 102a and 102b different in diameter from each other and is attached to a housing 110; an inner ring 103 that has double row raceway surfaces 103a and 103b corresponding to the raceway surfaces 102a and 102b of the outer ring 102 and is attached to a rotation shaft (not shown); a plurality of large diameter balls 104 and a plurality of small diameter balls 105 that are disposed between the raceway surfaces 102a and 103a, and 102b and 103b of the rows of the inner and outer rings 102 and 103 with different pitch diameters, respectively; a large diameter cage 106 that retains the plurality of large diameter balls 104; and a small diameter cage 107 that retains the plurality of small diameter balls 105.

The housing 110 is provided with a lubricant supplying passage 110a for supplying lubricant to the small diameter side of the double row ball bearing 101. At the middle of the outer ring 102 in the axial direction, a plurality of lubricant discharging passages 108 for discharging the lubricant in the bearing 101 to the outside are provided at predetermined intervals in a circumferential direction. The housing 110 is provided with a lubricant circulating passage 110b for returning the lubricant, which is discharged from the lubricant discharging passage 108, to the lubricant supplying passage 110a.

In the same figure, an outer diameter of the left raceway surface 103b of the inner ring 103 is smaller than an outer diameter of the right raceway surface 103a of the inner ring 103, and an inner diameter of the left raceway surface 102b of the outer ring 102 is smaller than an inner diameter of the right raceway surface 102a of the outer ring 102. Contact angles between the large diameter ball 104 and the small diameter ball 105 are in the same direction (which is not limited to the same angle). Each of the cages 106 and 107 overall has a tapered tubular shape, a diameter of which gets larger as it goes from the left side to the right side. The lubricant discharging passage 108 is provided at a position corresponding to a right end section (discharge end section) of the small diameter cage 107. Lubricant is supplied from the left side (i.e., small diameter side) of the figure and then the lubricant is discharged from the right side (i.e., large diameter side) of the figure by a pumping action of the double row ball bearing 101.

Similarly to the first embodiment, the double row ball bearing 101 of the second embodiment is suitably used as a bearing device that rotatably supports the pinion shaft 42 to the housing 41 in the differential gear device for vehicles shown in FIG. 2. The double row ball bearing 101 is lubricated by the lubricant housed in the housing 41. Since the double row ball bearing 101 is configured to concentrate the lubricant on the lower portion of the housing 41, there is no case where the supply amount of lubricant is insufficient. When the number of rotation increases, the pumping action increases and thus the amount of lubricant flowing into the bearing 101 increases. The increase of the amount of lubricant causes increase in agitation resistance, and thus torque increases. However, in the double row ball bearing 101 of the invention, as described above, since the outer ring 102 is provided with the lubricant discharging passage 108, a large amount of lubricant is discharged to the outside as the centrifugal force gets larger. As a result, the amount of lubricant staying in the bearing 101 is appropriately controlled, thereby reducing torque.

In the aforementioned embodiment, there is described a tandem double row ball bearing 101 having the raceway surfaces 102a, 102b, 103a, and 103b different in diameter, but the configuration of the outer ring 102 provided with the lubricant discharging passage 108 may be applied to a double row ball bearing having raceway surfaces equal in diameter.

Third Embodiment

Figure 4:
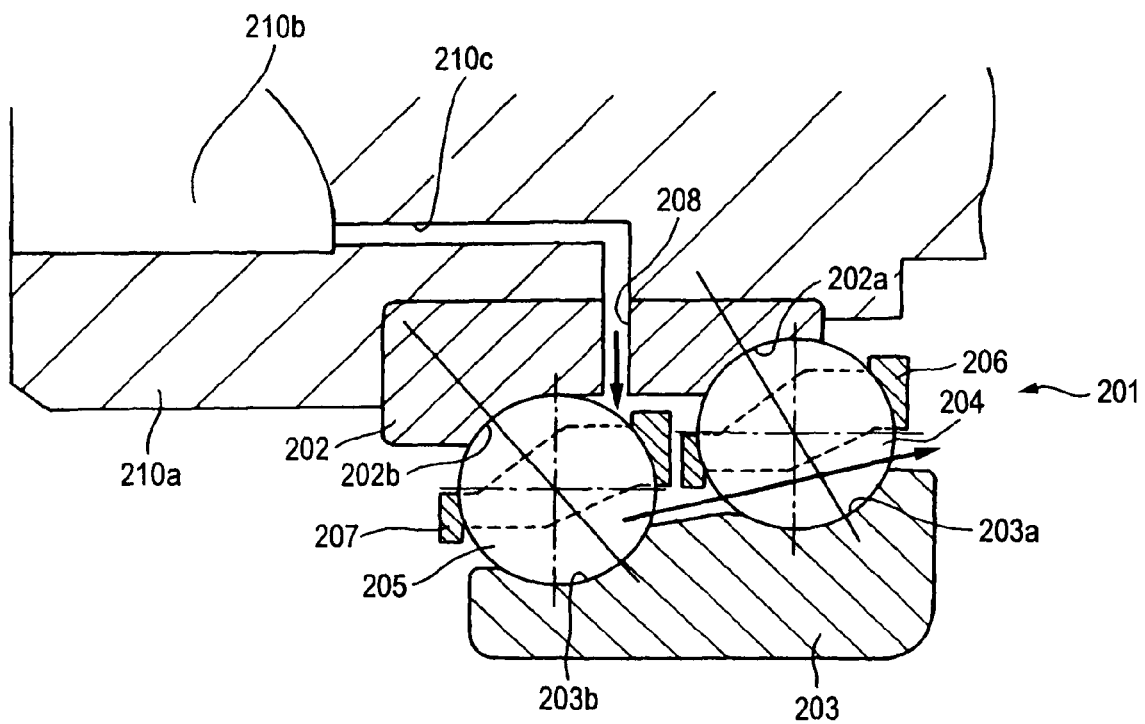
FIG. 4 is a longitudinal sectional view illustrating an upper halt portion of a double row ball bearing according to a third embodiment of the invention.

FIG. 4 illustrates a third embodiment of a double row ball bearing according to the invention. The double row ball bearing 201 includes: an outer ring 202 that has double row raceway surfaces 202a and 202b different in diameter from each other and is attached to a housing 210; an inner ring 203 that has double row raceway surfaces 203a and 203b corresponding to the raceway surfaces 202a and 202b of the outer ring 202 and is attached to a rotation shaft (not shown); a plurality of large diameter balls 204 and a plurality of small diameter balls 205 that are disposed between the raceway surfaces 202a and 203a, and 202b and 203b of the rows of the inner and outer rings 202 and 203 with different pitch diameters, respectively; a large diameter cage 206 that retains the plurality of large diameter balls 204; and a small diameter cage 207 that retains the plurality of small diameter balls 205.

In the housing 210, an end portion of a passage for supplying lubricant to the small diameter side of the double row ball bearing 201 for oil bath lubrication is closed by a wall 210a or the like. As a result, a lubricant reservoir 210b is formed on the closing wall 210a serving as a bottom wall. In the uppermost portion of the outer ring 202 and in the middle of the axial direction, a lubricant supplying passage 208 for supplying lubricant into the bearing 201 is provided. Corresponding thereto, an in-housing lubricant supplying passage 210c communicating between the lubricant reservoir 210b and the lubricant supplying passage 208 is formed in the housing 210. The lubricant supplying passage 208 is provided at a position where the lubricant is dripped to the small diameter balls 205. A passage diameter of the lubricant supplying passage 208 is set to optimize the amount of lubricant staying in the bearing 201.

In the same figure, an outer diameter of the left raceway surface 203b of the inner ring 203 is smaller than an outer diameter of the right raceway surface 203a of the inner ring 203, and an inner diameter of the left raceway surface 202b of the outer ring 202 is smaller than an inner diameter of the right raceway surface 202a of the outer ring 202. Contact angles between the large diameter ball 204 and the small diameter ball 205 are in the same direction (which is not limited to the same angle). Each of the cages 206 and 207 overall has a tapered tubular shape, a diameter of which gets larger as it goes from the left side to the right side. The pumping action of the double row ball bearing 201 is to send the lubricant from the left side (i.e., small diameter side) of the figure to the right side (i.e., large diameter side) of the figure. In the double row ball bearing 201, the lubricant is directly supplied to the balls 205 disposed on the small diameter side (pumping action inflow side), and the lubricant is supplied to the balls 204 disposed on the large diameter side (pumping action discharge side) by the pumping action of the small diameter balls 205.

Accordingly, it is possible to the smallest amount of lubricant necessary for the contact portion to be lubricated between the balls 204 and 205 and the raceway surfaces 202a, 203a, 202b, and 203b. Therefore, it is possible to reduce torque without increase in torque caused by agitation resistance.

Similarly to the first embodiment, the double row ball bearing 201 of the third embodiment is suitably used as a bearing device that rotatably supports the pinion shaft 42 to the housing 41 in the differential gear device for vehicles shown in FIG. 2. The double row ball bearing 201 is lubricated by the lubricant housed in the housing 41. However, the large amount of lubricant is not supplied from the small diameter side as in the conventional oil bath lubrication, but the lubricant is supplied only from the lubricant supplying passage 208 provided in the outer ring 202. In case of oil bath lubrication, the agitation resistance may easily increase according to increase of the amount of lubricant. However, in the bearing 201 of the invention, as described above, only the outer ring 202 is provided with the lubricant supplying passage 208. Accordingly, it is easy to appropriately control the amount of lubricant supplied into the bearing 201 by adjusting the passage diameter or the like of the passage, and it is possible to reduce torque.

In the aforementioned embodiment, there is described a tandem double row ball bearing 201 having the raceway surfaces 202a, 202b, 203a, and 203b different in diameter, but the configuration of the outer ring 202 provided with the lubricant supplying passage 208 may be applied to a double row ball bearing having raceway surfaces equal in diameter.

In addition, the double row ball bearing 1, 101, 201 of the invention may be also used as a bearing that supports a pinion shaft of a transaxle device, in addition to the use for supporting the pinion shaft of the differential gear device.

What is claimed is:

1. A double row ball bearing comprising:
an outer ring that includes double row raceway surfaces different in diameter from each other;
an inner ring that includes double row raceway surfaces corresponding to the raceway surfaces of the outer ring, respectively;
a plurality of large diameter balls and a plurality of small diameter balls that are disposed between the raceway surfaces of the rows of the inner and outer rings with different pitch diameters, respectively;
a large diameter cage that retains the plurality of large diameter balls; and
a small diameter cage that retains the plurality of small diameter balls,
wherein the large diameter cage comprises an asymmetric shape with respect to a center in an axial direction, a diameter of the large diameter cage close to an end section opening is greater than a diameter close to the small diameter cage,
wherein the small diameter cage comprises a symmetric shape with respect to a center in an axial direction, a diameter of the small diameter cage close to an end section opening is substantially equal to a diameter close to the large diameter cage, and
wherein the plurality of large diameter balls and the plurality of small diameter balls are disposed between the raceway surfaces of the rows of the inner and outer rings such that each of ball bearings constituted by the large diameter balls and the small diameter balls forms an angular ball bearing.

2. The double row ball bearing according to claim 1, wherein pillar portions of the large diameter cage are inclined to the axial direction so that diameters thereof get larger toward the outside in the axial direction, and pillar portions of the small diameter cage are parallel to the axial direction.

3. A differential gear device comprising:
a pinion shaft that is rotatably supported to a housing and that includes a pinion gear disposed at a rear end thereof;
a ring gear engaging with the pinion gear;
a pair of double row ball bearings that allows the pinion shaft to be rotatably supported to the housing, one of which is located on a side of the pinion gear and the other of which is located on a side opposite to the pinion gear; and
a flange joint that is provided at an outer end of the pinion shaft to connect a drive shaft,
wherein at least one of the double row ball bearings comprises the double row ball bearing according to claim 1.

4. A double row ball bearing comprising:
an outer ring;
an inner ring;
a plurality of balls disposed in double rows between the inner and outer rings; and
cages that retain the balls, in which lubricant is moved by a pumping action of the bearing,
wherein the outer ring is provided with a lubricant discharging passage for discharging the lubricant between the double rows of balls to outside the double rows of balls, and
wherein the balls are disposed between raceway surfaces of the double rows between the inner and outer rings such that each of ball bearings constituted by the balls forms an angular ball bearing.

5. The double row ball bearing according to claim 4, wherein the lubricant discharging passage is disposed at an axial position corresponding to an axial end section of a cage of the cages between the double rows of balls.

6. The double row ball bearing according to claim 4, wherein the cages include a large diameter cage and a small diameter cage, and
wherein the lubricant discharging passage is disposed at an axial position corresponding to an axial end section of the small diameter cage between the double rows of balls.

7. A double row ball bearing according to claim 4, wherein the cages include a large diameter cage to retain one row of balls of the double rows of balls and a small diameter cage to retain another row of balls of the double rows of balls.

8. A differential gear device comprising:
a pinion shaft that is rotatably supported to a housing and that includes a pinion gear disposed at a rear end thereof;
a ring gear engaging with the pinion gear;
a pair of double row ball bearings that allows the pinion shaft to be rotatably supported to the housing, one of which is located on a side of the pinion gear and the other of which is located on a side opposite to the pinion gear; and
a flange joint that is provided at an outer end of the pinion shaft to connect a drive shaft,
wherein at least one of the double row ball bearings comprises the double row ball bearing according to claim 4.

9. The double row ball bearing according to claim 1, wherein a diameter of a radially outermost portion of an axial end of the small diameter cage close to the large diameter cage is less than a diameter of a radially outermost portion of an axial end of the large diameter cage close to the small diameter cage.

10. The double row ball bearing according to claim 1, wherein contact angles of the large diameter balls are in a same direction as contact angles of the small diameter balls.

11. A double row ball bearing comprising:
an outer ring;
an inner ring;
a plurality of balls disposed in double rows between the inner and outer rings; and
cages that retain the balls, in which lubricant is moved by a pumping action of the bearing,
wherein the lubricant is discharged from a discharge end section of the pumping action, the lubricant is prevented from flowing in from an inflow end section of the pumping action, and the outer ring is provided with a lubricant supplying passage for dripping the lubricant to balls of the plurality of balls disposed on the inflow side of the pumping action, and
wherein the balls are disposed between raceway surfaces of the double rows between the inner and outer rings such that each of ball bearings constituted by the balls forms an angular ball bearing.

12. A differential gear device comprising:
a pinion shaft that is rotatably supported to a housing and that includes a pinion gear disposed at a rear end thereof;
a ring gear engaging with the pinion gear;
a pair of double row ball bearings that allows the pinion shaft to be rotatably supported to the housing, one of which is located on a side of the pinion gear and the other of which is located on as side opposite to the pinion gear; and
a flange joint that is provided at an outer end of the pinion shaft to connect a drive shaft, wherein at least one of the double row ball bearings comprises the double row ball bearing according to claim 11.

13. A double row ball bearing according to claim 11, wherein the cages include a large diameter cage to retain one row of balls of the double rows of balls and a small diameter cage to retain another row of balls of the double rows of balls.

* * * * *